United States Patent [19]

Unewisse et al.

[11] Patent Number: 5,168,618
[45] Date of Patent: Dec. 8, 1992

[54] METHOD OF FORMING A CRIMPED SLEEVE TO TUBE JOINT

[75] Inventors: Heinz Unewisse, Muehlheim; Herbert Foering, Solingen, both of Fed. Rep. of Germany

[73] Assignee: Mannesamnn AG, Duesseldorf, Fed. Rep. of Germany

[21] Appl. No.: 626,258

[22] Filed: Dec. 11, 1990

Related U.S. Application Data

[60] Division of Ser. No. 408,768, Sep. 18, 1989, Pat. No. 5,007,667, which is a continuation-in-part of Ser. No. 285,498, Dec. 16, 1988, abandoned.

[30] Foreign Application Priority Data

Sep. 30, 1988 [DE] Fed. Rep. of Germany ....... 3833748
Oct. 6, 1988 [DE] Fed. Rep. of Germany ....... 3834353

[51] Int. Cl.⁵ ............................................ B21D 39/00
[52] U.S. Cl. ........................................ 29/508; 72/416
[58] Field of Search ............... 285/382.7, 417, 418, 285/369, 373, 419; 29/516, 508, 510, 237; 72/416

[56] References Cited

U.S. PATENT DOCUMENTS

| 1,508,026 | 9/1924 | Noble | 285/918 X |
| 2,132,555 | 10/1938 | Baxter | 29/516 |
| 3,149,861 | 9/1964 | Lorsson | 285/382.2 X |
| 3,561,251 | 2/1971 | Motsumoto | 285/382.2 X |
| 3,596,939 | 8/1971 | Gibson | 285/382.2 |
| 4,192,171 | 3/1980 | Hamilton | 72/416 |
| 5,007,667 | 4/1991 | Unewisse et al. | 285/382.2 |

FOREIGN PATENT DOCUMENTS

| 2725280 | 12/1978 | Fed. Rep. of Germany ... 285/382.2 |
| 106427 | 7/1962 | Japan | 72/416 |
| 88939 | 7/1980 | Japan | 29/508 |
| 8709 | of 1897 | United Kingdom | 72/416 |
| 688699 | 3/1953 | United Kingdom | 29/508 |

Primary Examiner—Dave W. Arola
Attorney, Agent, or Firm—Abelman Frayne & Schwab

[57] ABSTRACT

A method is provided of forming a sleeve to tube joint of enhanced resistance to pressure loading and which can be employed with relatively large diameter pipes, in which the sleeve and tube are crimped to each other by diametrically opposite crimps extending concavely inwardly of the outer surface of the sleeve and convexly inwardly of the inner surface of the tube, the respective crimps being isolated from each other by struts extending parallel to the longitudinal axis of the sleeve and tube, provision being made for equalization of the stresses produced in a seal ring contained in an annular flange of the sleeve during compressive reduction of the annular flange, provision also being made for the axial movement of the sleeve relative to the tube during compressive reduction of the flange.

4 Claims, 8 Drawing Sheets

METHOD OF FORMING A CRIMPED SLEEVE TO TUBE JOINT

This is a Rule 60 divisional application of continuation-in-part application Ser. No. 408,768 filed Sep. 18, 1989, and now U.S. Pat. No. 5,007,667 issued Apr. 16, 1991, that application being a continuation-in-part of co-pending application Ser. No. 285,498 filed Dec. 16, 1988, and which is now abandoned.

FIELD OF THE INVENTION

This invention relates to joints for piping systems in which a sleeve containing a sealing member is permanently crimped onto a plain ended unthreaded pipe end in a manner preventing disconnection of the sleeve from the pipe, other than by destruction of the joint. The sleeve can be a double ended with two sealing members for interconnecting one pipe with another, or, it can be part of a fitting of any form which has been formed integrally with or joined to that end of the sleeve which is to project beyond the end of a pipe.

While not limited thereto, the crimped joint of the present invention finds particular application in crimped sleeve to tube pipe joints used in connection with relatively thin walled metal pipe.

BACKGROUND OF THE INVENTION

Crimped sleeve to tube pipe joints as presently known, are well known in the art, and because of significant advantages of the concept have gained acceptance for many uses.

Tube joints of this general type were first conceived of and described in U.S. Pat. No. 3,149,861 to Larson issued Sep. 22, 1964. As there described, a sleeve is compressively reduced, such as by crimping, onto a pipe end to provide the required interconnection between the sleeve and the pipe end.

There are many easy recognized advantages to the concept. Pipe joining can be accomplished without the need for welding or heat. Minimum pipe end preparation is required, and, the joint, once made, is permanent and not easily subject to tampering. However, in the practice of the technology many problems have arisen which have limited its application to small diameter pipes or tubes, and, as a result, its popularity has been restricted.

One significant impediment to more widespread adaptability is the limited resistance of such pipe joints to axial forces which occur upon pressurization of the pipeline incorporating the joint. Another problem is that the joint has little resistance to torsional loading.

Recognizing these problems, Mannesmann A.G. has over many years developed significant improvements in such joints. These have included modifications in the configuration of the crimped pattern as well as improved sealing means. These improvements have significantly enhanced the adaptability and market acceptance of crimped sleeve to tube pipe joints, sometimes referred to as the "press fitting system". As a result, its popularity has grown substantially.

Despite this, press fitting systems in current usage are limited to small diameter tubing, and, such systems are unable to satisfy the needs of users of relatively larger diameter tube. In those instances, the problems of inadequate axial and torsional resistance persisted.

In apparent recognition of these problems, it has been suggested in Japanese patent 88939 issued May 7, 1980 in the name of Nippon Benkan Kogyo K.K. that further modifications be made, particularly in the shape of the crimp. Other suggestions which would result in an increase in resistance to axial and torsional loading are made which incorporate a hexagonal crimp in the sleeve and the pipe, the hexagonal crimp being effective not only to resist axial separation of the sleeve and pipe, but also being effective to resist torsional loads that may be imposed on the joint. It is believed that the product described in the Japanese patent has not been marketed. Further, as hereinafter more fully set out in the Japanese patent, the configuration there described does not adequately solve the problem of providing sufficient resistance to separation of the sleeve from the tube.

When pressurized, internal pressure in the pipe acts to produce forces in an axial direction to cause separation of the sleeve from the pipe end. Pressure within the pipe also acts in radial directions to expand the crimped joint back to its in-round condition, which can result in release of the sleeve from the pipe end.

These conditions act in unison and if sufficient to cause a weakening of the joint the results can be quite serious, particularly if the pressurized fluid being conveyed is flammable, toxic, corrosive or acidic, or, is heated fluid, such as found in a domestic or industrial heating system.

As aforementioned, the formation of sleeve to tube joints generally involves the positioning of a sleeve over the pipe end. The sleeve includes a circumferential channel on its inner surface in which a sealing member, preferably a seal ring is received. The internal diameter of the sleeve and that of the seal ring must be sufficiently large to permit insertion of the sleeve and its contained seal ring onto the pipe end without cutting or abrading the seal ring, and, in the absence of an interference fit of the inner circumference of the sleeve with the exterior surface of the pipe.

As a result the inner circumferential length of the sleeve is greater than the outer circumferential length of the pipe. This inhibits continuous face to face seating of the sleeve onto the pipe during the crimping operation, unless some manner of shrinking the internal diameter of the sleeve can be devised. However, shrinking of the diameter of the sleeve poses unusual problems, in that the assembly of the joint will ordinarily take place at the actual site of the installation, and often times in locations that are not readily accessible and which require effecting the crimp in the joint from one lateral side of the joint.

Special crimping tools have been devised to accomplish this purpose, a suitable one being sold by Novopress GmBH & Co. KG. Thus, presently used crimping tools incorporate a pair of jaws that move towards the outer periphery of the sleeve, and effect the interconnecting crimp between the sleeve and the pipe. This movement of the jaws, however, results in displacement of the sleeve to an out of round condition relative to the pipe, and most importantly, results in uneven stressing of the seal ring. The body of the seal ring can move or displace circumferentially of the pipe from the location of first engagement of the crimping jaws to the position of terminal engagement of the crimping jaws.

This can result in uneven stressing of the seal ring, and is particularly disadvantageous where larger diameter sleeves and pipeline are to be used because it contributes to failure of the joint under pressure loading. Additionally, it severely limits the maximum internal pressure to which the piping system can be subjected without failure of the seal provided by the seal ring.

The present practice of employing a crimp having an hexagonal form simulating the exterior surfaces of a threaded nut does not overcome the problems. The pressure within the piping system acts radially outwardly on the flats of the hexagon, which have a low resistance to outward bowing, and, can cause outward ballooning of the flats, with a consequential decrease in the holding power of the joint, and subsequent failure of the joint.

The formation of a hexagonal crimp encircling the joint does have some advantage in that it increases resistance of the joint to torque loading. However, this is of only limited effect, in that the hexagonal crimped outer surface of the pipe has edges that can act as camming members operative to force the hexagonal crimp in the sleeve towards an in-round condition. If this should happen, the resistance of the joint to failure under pressure loading is seriously impaired.

SUMMARY OF THE INVENTION

The present invention is directed to overcoming these problems in known crimped sleeve to tube joints, in order to provide a crimped sleeve to tube joint that can withstand pressures considerably in excess of those considered to be an upper limit, and which can be used in conjunction with pipes of larger diameters and tolerances than those contemplated according to the prior art teachings, and additionally, which permits crimped sleeve to tube joints to be employed for the interconnection of thin walled pipe of a diameter considerably in excess of the one inch pipe of the prior art.

The present invention provides crimped sleeve to tube joints that can be successfully employed in piping systems in which the internal pressure exceeds 1.000 pounds per square inch, and, the pipe diameters exceed 2 inches.

This is accomplished according to the present invention by several modifications of the prior art teachings in order to arrive at a crimped sleeve to tube joint of considerably enhanced strength, and which is far less prone to leakage of the formed joint.

Essential to the inventive concept is the greater equalization of the stresses produced in the seal ring during the crimping operation.

Preferably, crimping of the flange of the sleeve containing the seal ring is commenced prior to crimping of the sleeve to the pipe end, to confine and stress the seal ring prior to axial immobilization of the sleeve relative to the pipe, thus allowing for limited axial movement between the sleeve and the pipe during the crimping of the sleeve flange.

Crimping of the sleeve to the pipe then continues in a manner producing diametrically opposed arcuate channels in the sleeve and in the pipe, the respective arcuate channels being separated one from the other by an axially straight un-crimped portion of the sleeve and pipe. The axially straight un-crimped portions of the sleeve and pipe then act as struts interconnecting the portions of the sleeve and of the pipe on opposite axial sides of the crimp. The struts are themselves highly resistive to axial elongation of the sleeve or of the pipe, and are operative to preserve the structural integrity of the formed crimp.

The arcuate crimps extend inwardly of the pipe diameter, and, during their formation produce compressive stresses in the struts, which are effective to resist such compressive stresses, thus enabling formation of the crimp in a precise and dimensionally accurate manner.

The crimps themselves are formed as surfaces arranged in crenelate formation that converge towards the longitudinal axis of the pipe.

Crimping of the sleeve and tube in the presence of the struts results in a localized shrinkage in the internal diameter of the sleeve, which is operative to take up the clearance between the internal circumference of the sleeve and the external circumference of the pipe end.

By inwardly crimping the joint in this manner, a very significant advantage is produced in the strength of the crimped joint. When the joint is subjected to pressure internally of the pipe, then, the flanks of the crimps are placed under compressive stresses and attempt to expand radially outwardly to the initial in-round condition of the sleeve and pipe.

Such expansion is, however, inhibited by the axially adjacent in-round portions of the sleeve, sides of the crimp and pipe, which are then placed under a hoop stress. For the crimps to move back to their in-round condition, axial elongation of the sleeve and pipe at the location of the crimps would be required. However, such axial elongation is inhibited by tensional stress produced in struts at the respective ends of the crimps.

The inability of the struts to elongate negates any opportunity for the sleeve and pipe to elongate axially at the location of the crimps, and in turn, negates opportunity of the crimps to return to an in-round condition of the sleeve and pipe throughout the arcuate extent of the crimps, such as could occur in the event that the crimps were to be formed as continuous crimped grooves completely encircling the sleeve and the pipe. In such a construction of completely encircling crimps, then, the pipe and sleeve would act in the manner of a bellows, thus permitting axial elongation of the sleeve and the pipe and a substantial reduction in the strength of the joint under the axial loading generated by the pressure internally of the pipe.

In this manner, a crimped sleeve to tube joint is provided of very considerably enhanced resistance to failure under axial loading produced by pressurization of the system. Also, a joint is provided in which the efficacy of the sealing power of the seal ring is greatly enhanced, thus enabling operation of a large diameter piping system incorporating the joint of the invention at pressures considerably higher than previously considered to be the upper limit.

Resistance to torsional loading of the joint is enhanced by the struts in the same manner as the resistance to axial loading of the joint is enhanced by the struts. The struts lie on diameters greater than the inner diameter of the crimps, thus inhibiting relative rotation between the sleeve and pipe.

These desirable attributes can be accomplished by the use of relatively simple power tools that are readily portable and which can be used with ease in actual on-site locations, thus eliminating the necessity of pre-assembly under factory conditions.

DESCRIPTION OF THE DRAWINGS

The prior art construction and preferred embodiments of the invention are now described with reference to the accompanying drawings, in which FIGS. 1 through 4A are illustrative of the prior art, and, FIGS. 5 through 12 are illustrative of the present invention, and, in which:

DESCRIPTION OF THE PRIOR ART

Figure 1:
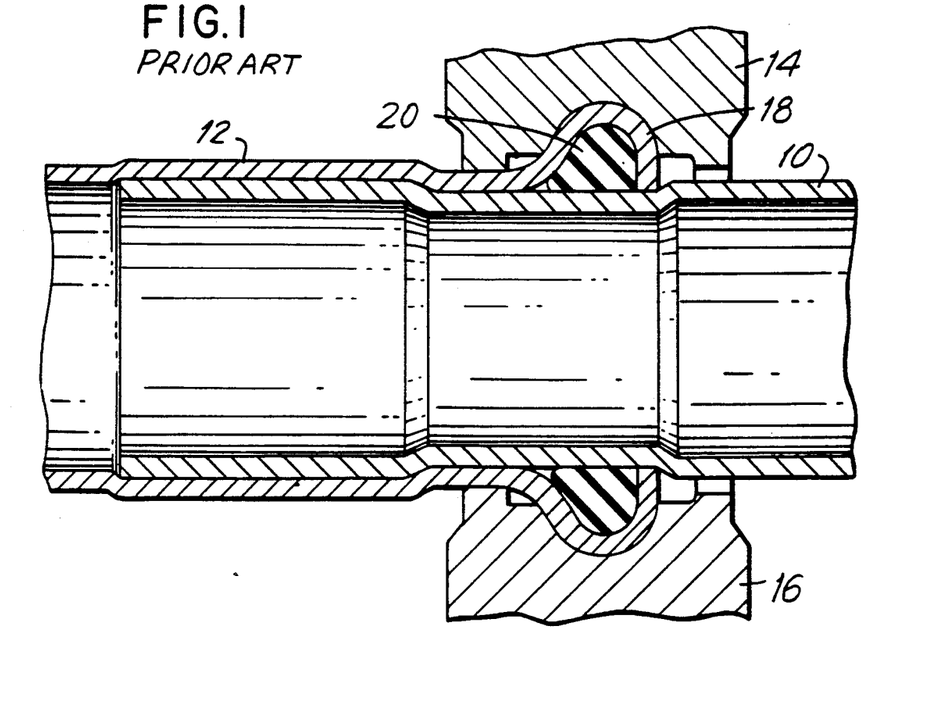
FIG. 1 is a longitudinal cross-section through a prior art sleeve to tube joint.
Figure 2:
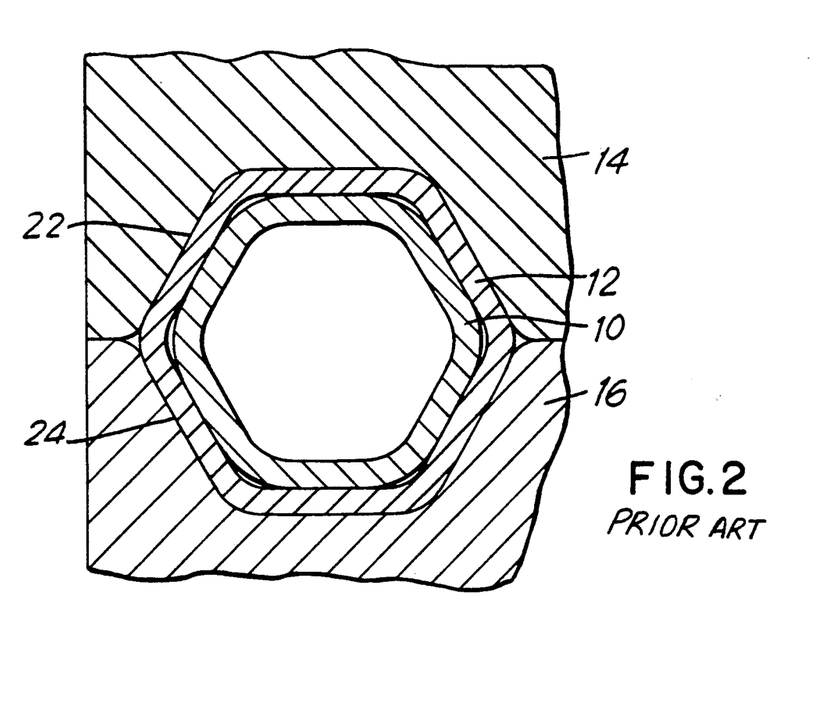
FIG. 2 is a cross-section of FIG. 1, and additionally showing forming dies used in the formation of the joint.

The sleeve to tube joint now discussed with reference to FIGS. 1 through 4A of the drawings is exemplary of a sleeve to tube joint construction as previously known in the art. In FIGS. 1 and 2, the tube is indicated at 10 and the sleeve at 12, the joint being shown in the process of assembly by means of the use of dies 14 and 16 that are moved arcuately relative to each other to effect compressive shrinkage of a curved annular flange 18 in which an seal ring is confined.

The jaws 14 and 16, respectively, include forming lands 22 and 24 at their opposite axial sides, which are respectively formed as one half of a hexagon in peripheral contour. Upon closing of the dies, the annular flange 18 is compressed radially to reduce the diameter of the flange, and simultaneously, the tube and sleeve are compressively crimped into an hexagonal form.

The compression of the flange 18 results in biting of the free edge of the flange into the exterior of the tube 10, and additionally, provides the hexagonal crimp. This substantially increases the resistance of the joint to separation under axial loading, and, significantly increases the resistance of the joint to oppositely acting torsional loads exerted on the tube 10 and sleeve 12.

However, the formed joint, while being of increased strength, is limited in its application to relatively low-pressure piping systems, and, ones in which torsional loading between the sleeve and the tube is not anticipated, or, is expected to be of a minor order.

The limitations imposed on the pressure loading, and also the diameter of such a joint as formed according to the prior art, are a consequence of the manner in which the annular flange 18 is compressively shrunk, and, as a consequence of the employment of a hexagonal crimp, as now discussed with reference to FIGS. 3, 4 and 4A.

Tools as presently available for effecting the crimp include dies that move along arcuate paths as the dies move towards face engagement.

Figures 3, 4, 4A:
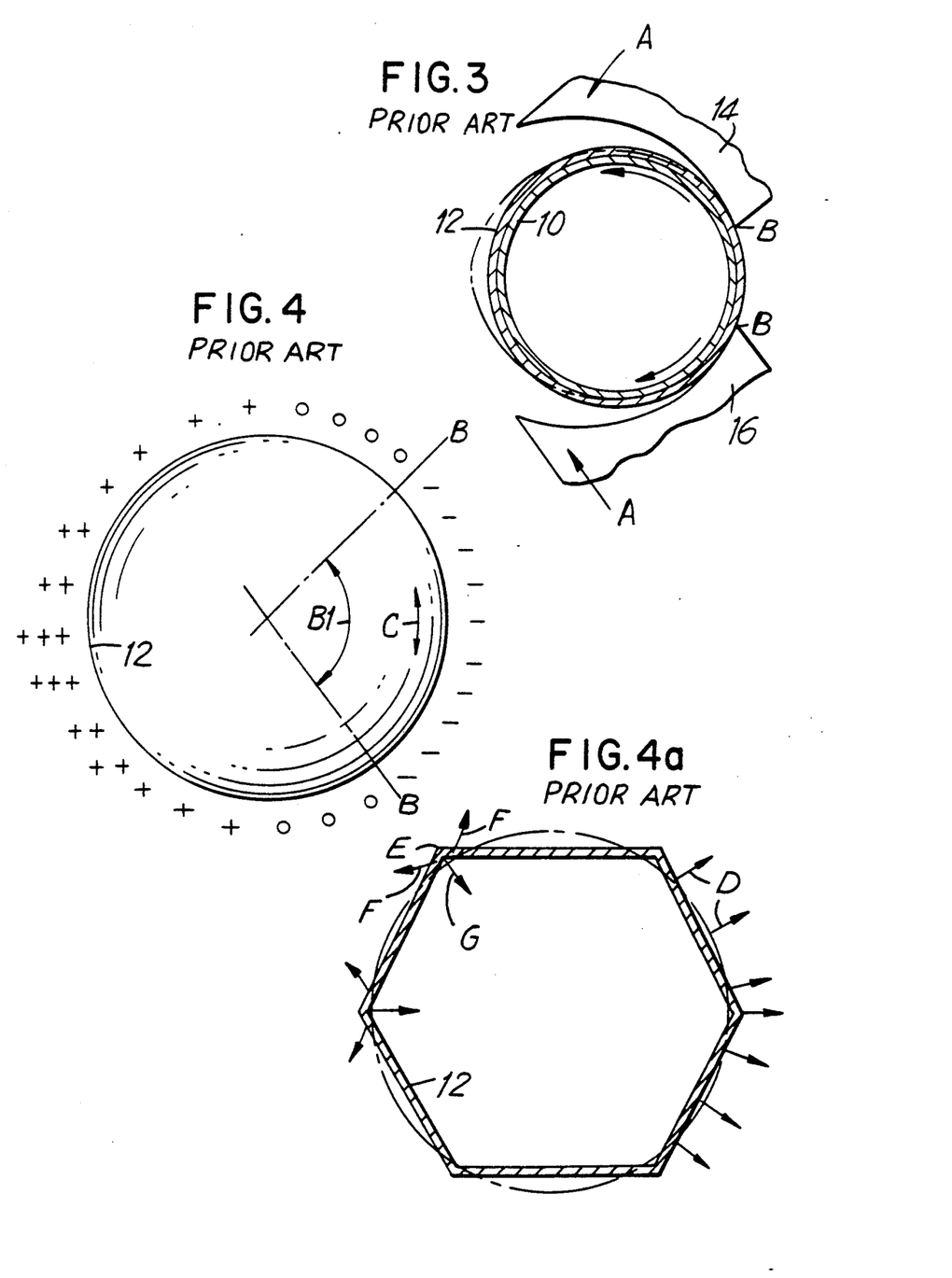
FIG. 3 is a diagrammatic illustration of the prior art manner of crimping.
FIG. 4 is a diagram illustrating stress distribution in the seal ring employed in prior art FIG. 1.
FIG. 4A is a diagram illustrating the effects of torsional and radial expansion forces exerted on a hexagonal crimp of prior art FIG. 1.

The effects of such a movement are illustrated in FIG. 3, in which the dies 14 and 16 are shown as moving along arcuate paths as indicated by the arrows A—A.

Such a movement of the dies results in the dies initially engaging the sleeve 12 at positions B—B, displaced to one side of the longitudinal axis of the sleeve, formation of the joint commencing at the points B—B. This, however, results in distortion of the sleeve, and ultimately distortion of the tube into an out-of-round condition, which ultimately results in uneven stressing of the seal ring, and which can lead to failure of the seal provided by the seal ring under pressure loading.

As is illustrated in FIG. 4A, commencement of formation of the joint results in a compressive stress being applied to the seal ring over the arcuate extent of the sleeve subtended by the angle B1. Such a radially inward compressive stress is not accompanied to any material extent by circumferential compression in the direction of the arrows C, the seal ring at that time being under zero circumferential compression, and being capable of movement circumferentially of the sleeve and tube in a manner permitting the dissipation of such circumferentially acting compressive stresses.

As the dies progressively move along their arcuate paths, circumferentially acting compressive forces are generated in the seal ring, which result in displacement of the seal ring circumferentially within the flange of the sleeve to that side of the sleeve opposite to the points B—B of initial engagement with the dies.

This can result in over-compression of the seal ring at one side of the joint as indicated by the plus signs, with a possibility of extrusion of the material of the seal ring prior to completion of formation of the joint. This can result in zones which are under little or no circumferential compression as indicated by the zero signs, and further zones in which the compressive stresses are exclusively radial, to the elimination of any circumferential compressive stresses, as indicated by the minus signs.

Optimally, the compressive stresses produced in the seal ring should be equal at all positions circumferentially of the seal ring in order to provide for maximum sealing efficiency of the seal ring. However, such a condition is only possible in the event that an infinite number of dies each moving radially inwardly of the axis of the sleeve and tube are provided, which clearly, is impractical in actual practice, other than, for example, by a hydro-forming operation, which clearly is impractical other than in a workshop.

The strength of such a prior art joint, however, is dependent on the manner in which the sleeve has been crimped directly to the tube exterior. The biting engagement of the sleeve flange with the tube exterior has relatively poor resistance to axial loading of the joint, such as could cause the sleeve to pull off the end of the tube, and has relatively poor resistance to oppositely acting torsional forces that could cause rotation of the sleeve relative to the tube and release of the crimped interconnection.

While providing a joint of enhanced strength, the strength of a joint provided by a hexagonal crimp and is encumbered with limitations, as now discussed with reference to FIG. 4A.

FIG. 4A illustrates schematically the effects of pressure on the interior of a sleeve or tube having an hexagonal crimp, and is a diagrammatic cross-section through such a crimp.

Up to relatively low internal pressures, the walls of the hexagon will exhibit little or no movement. However, upon a rise in internal pressure, then, a point is reached at which the respective planar walls comprising the hexagon will commence to bow radially outwardly in the direction of the arrows D, i.e., the hexagon will attempt to revert to its original truly circular shape.

Concurrently with this outward bowing movement of the planar walls of the hexagon, a hinging movement will occur at the junctures E of adjacent pairs of the planar walls, which will attempt to move in the directions of the arrows F, this resulting in an inward hinging movement at the corners of the hexagon in the direction of the arrow G, this further allowing the hexagonal shape to return to its original circular shape.

If the hexagonal configuration of the tube proceeds into round, this will cause a corresponding movement of the hexagonal crimp in the sleeve, which also will move into round. If the respective hexagonal crimps move into round, then, the securement against axial displacement of the sleeve and tube relative to each other is lost.

Such expansion of forces of the hexagon into round can be occurring in the presence of torsional forces acting oppositely on the sleeve and on the tube. If this condition occurs, then, the corners of the hexagon impressed in the tube and will act as camming members acting to cam the planar surfaces of the hexagon in the sleeve radially outwardly, again, acting to displace the planar surfaces of the hexagon back to the original circular form. If this should happen, then, resistance to torsional loading of the crimp will drop to an entirely negligible amount. Further, one of these conditions can aggravate the other, i.e., escalating pressure within the tube will reduce the torque absorbing capabilities of the crimp, and, excessive torque applied to the crimp will reduce the capability of the joint to withstand pressures of a predetermined maximum.

DESCRIPTION OF THE PREFERRED EMBODIMENTS

Referring now to FIGS. 5 through 11, a preferred embodiment of the present invention is disclosed, by means of which a sleeve to tube joint of increased resistance to axial separation and increased resistance to torsional loading is provided.

Figure 5:
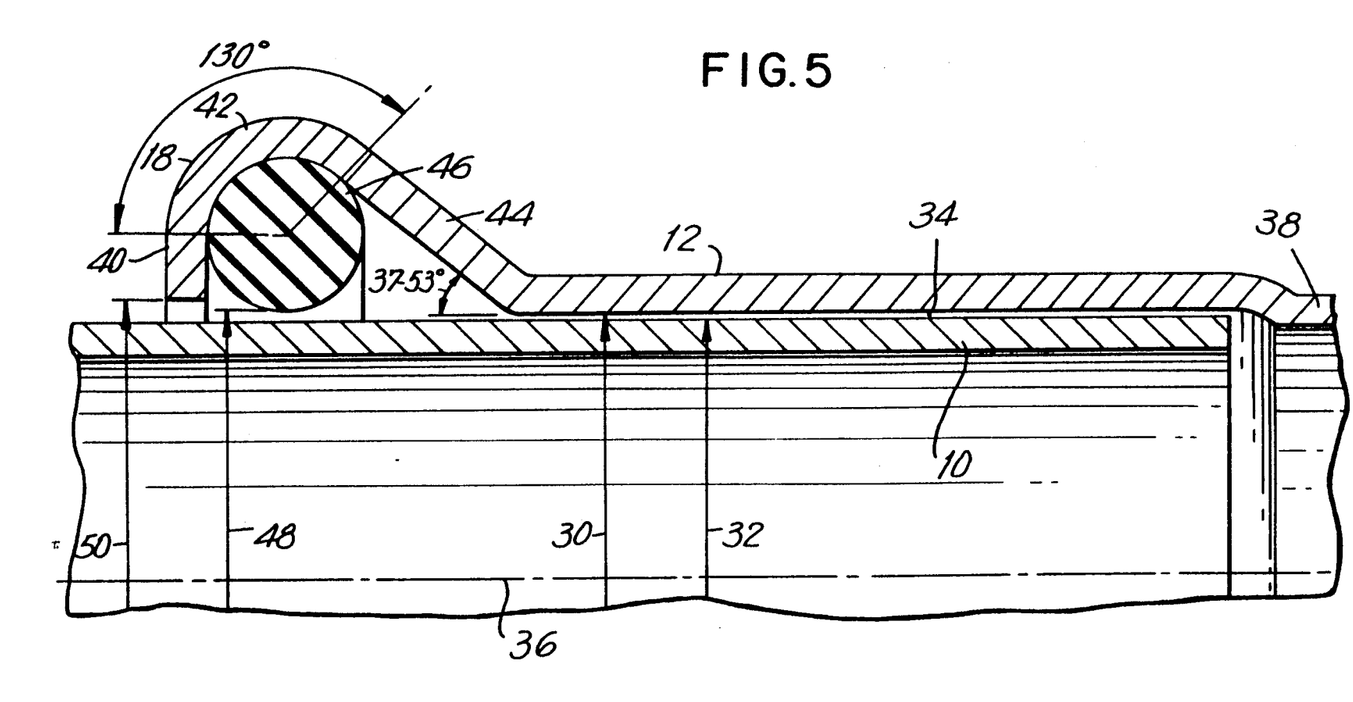
FIG. 5 is longitudinal cross-section through a tube and sleeve, prior to crimping according to the present invention.

Referring now to FIG. 5, the tube previously identified is indicated at 10, the sleeve is indicated at 12, and, the annular flange of the sleeve is indicated at 18.

The internal diameter 30 of the sleeve 12 is slightly greater than the outer diameter 32 of the tube 10, in order to provide a clearance of from 1.2 millimeters to 1.5 millimeters, such that the sleeve can be slid onto the pipe in the absence of an interference fit between those members.

The tube and the sleeve are each circular in transverse cross-section about a central axis 36 common to both the tube and the sleeve.

The end of the sleeve remote from the annular flange 18 is stepped at 38, thus limiting the extent to which the sleeve can be moved axially of the tube.

The annular flange 18 at the free end of the sleeve is comprised of a radial flange 40 which continues at its outer periphery into an arcuate portion 42, the arcuate portion 42 continuing tangentially into an inclined portion 44 defining an angle of between 37° and 53° relative to the central axis 36, to provide a cone angle of between 74° and 106°.

Positioned within the annular flange 18 is an seal ring 46, the seal ring 46 being of a cross-sectional diameter that is related to the internal diameter of the sleeve 12 on a 1:10 ratio. The inner radius of the arcuate portion 42 is the same as the cross-sectional radius of the seal ring 46, such that the arcuate portion 42 closely embraces the outer surface of the seal ring 46 through an angle of between 127° and 143°, depending on the selected cone angle. The seal ring 46 is of sufficient rigidity that it will remain in-situ within the arcuate portion 42, once installed therein for the sleeve and the seal ring to be handled as a unitary sub-assembly.

The inner diameter of the seal ring 48, and, the inner diameter of the radial flange 40 each is slightly greater than the inner diameter 30 of the sleeve 12, this being in order to avoid damage by scuffing of the inner diameter of the seal ring 46 as the sleeve 12 is passed onto the pipe, and also, in order to allow for the required extent of compressive reduction of the flange 18 during the crimping operation before the inner diameter of the radial flange 40 engages and bites into the outer surface of the tube 10.

Figure 6:
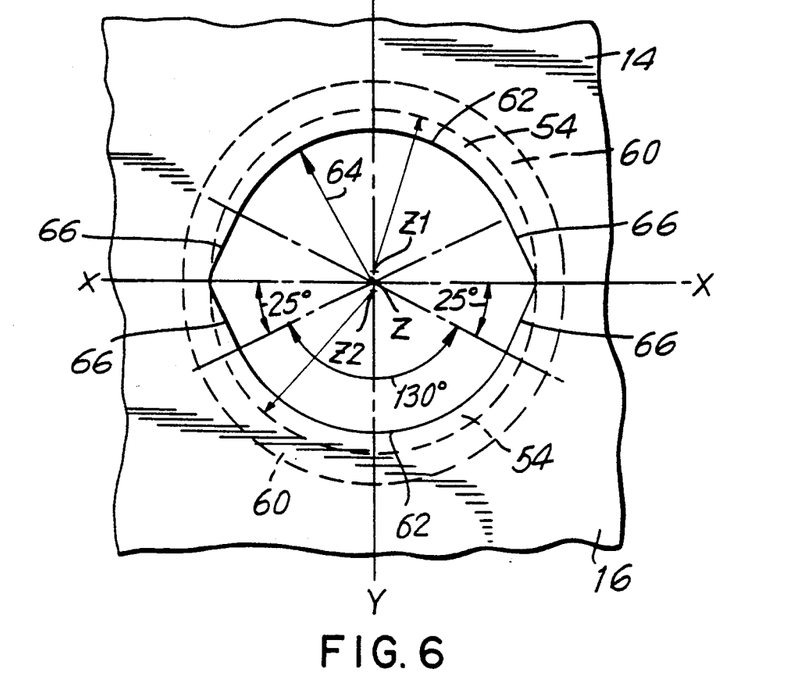
FIG. 6 is a front view of crimping dies employed in the crimping operation of the present invention.
Figure 7:
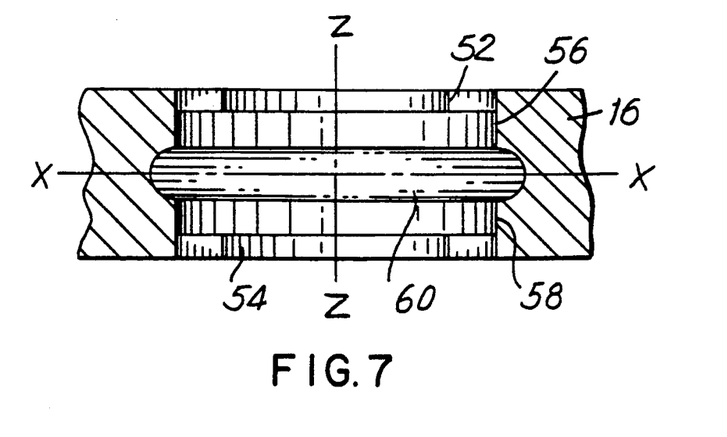
FIG. 7 is a top view of the bottom die shown in FIG. 6.

Reference is now made to FIGS. 6 and 7 of the drawings, which illustrate the dies employed in the crimping operation.

In FIGS. 6 and 7, the respective upper and lower dies 14 and 16 each include five die sections, as is more clearly illustrated in FIG. 7. These five die sections comprise axially outer sleeve crimping sections 52 and 54, intermediate flange forming sections 56 and 58, and, a central flange forming section 60. While these sections are duplicated symmetrically on each axial side of the central flange portion 60, it will be apparent that only three of the sections will be employed in effecting a crimp, either the sections 52, 56 and 60, or the sections 54, 58 and 60. The reason for providing duplicate sections in mirror image is in order to allow the die to be employed in effecting either a crimp to the right hand end of a sleeve, or the left hand end thereof.

The transverse section of the dies 14 and 16, as taken in the X-Y plane is discussed later with reference to FIG. 10. FIG. 6 shows a front view of the dies as seen from either side in the X-Y plane, the respective dies 14 and 16 being identical with each other and symmetrical in all respects.

The respective dies 14 and 16 are moveable away from each other in the direction of the Y axis to permit insertion of an unformed annular flange 18 (not shown in FIG. 6) into the jaws of the dies, and are then moveable towards each other in the direction of the Y axis for them to effect crimping and compressive reduction of the sleeve and the annular flange.

A selected one of the crimping sections 52 and 54 is employed for crimping the sleeve. Each of those sections includes an arcuate portion 62 which has its radius 64 generated from a point Z1 or Z2 on the Y axis that is spaced from the X-Z plane, such that the radius 64 is less than a radius taken from the Z axis. The arcuate extent of the respective portions 62 is 65° symmetrically on each side of the Y axis for a total of 130°, the arcuate portion 62 being of fixed radius throughout this arcuate extent.

The remaining extent of the crimping sections 52 or 54 are comprised of tangents to the arcuate portions 62, which diverge radially outwardly of the Y axis through an angular extent of 25°, and which terminate at the end of faces of the dies 14 and 16 in axial alignment with the edges of the intermediate flange forming sections 56.

The intermediate flange forming sections 56 and 58 and the central flange forming section 60, while appearing circular in FIG. 6, are not in fact truly circular, but are in fact radii taken from the Z1 or the Z2 axes, throughout an arcuate extent of 180°, the respective arcuate portions then proceeding into transitional portions for the distance Z1-Z or Z2-Z.

The reasons for this configuration of the dies is now explained.

On closure of the dies, the leading portions of the central flange forming section 60 and one of the intermediate flange forming sections 56 and 58 will engage the annular flange 18 at diametrically opposite sides thereof, and, will act to force the annular flange radially inwardly at the points of engagement and into compressive engagement with the outer surface of the tube at that location.

In so doing, both the annular flange and the tube will be forced into an elliptical condition, with the minor axis of the ellipse lying on the X axis and the major axis of the ellipse lying on the Y axis.

Continued movement of the dies 14 and 16 towards each other will then cause compression of the annular flange, which has increased in radius along the Y—Y axis, the compression commencing at the Y—Y axis, which attempts to return the annular flange to an in-round condition.

As this occurs, the annular flange attempts to form dual ellipses having their major axes displaced 90° one from the other. Continued compression then results in the formation of further major axes displaced at 45° relative to each other, followed by the development of further major axes at 22.5° to each other, followed by further major axes oriented at 11.25° relative to each other and so on, until such time as the entire periphery of the annular flange 18 is placed under a compressive hoop stress, at which time compressive reduction of the diameter of the flange proceeds.

In this manner, a progressively escalating number of axes passing through the Z—Z axis are developed as the dies move towards each other, this resulting in the development of a compressive stress in the contained seal ring in an entirely symmetrical manner which is ineffective to produce circumferential displacement of the seal ring.

Of essence to this concept is the initial reduction in radius of the annular flange along the X axis to produce elongation of the radius of the flange along the Y axis such that the annular flange initially assumes an elliptical configuration, and is then progressively returned to a circular configuration during the compressive reduction of the flange. Crimping of the flange 18 in this manner results in a very substantial equalization in the circumferential compressive stresses induced in the seal ring 20, as is diagrammatically illustrated in FIG. 11, in which the plus signs indicate the initial zones of circumferential compression, and the double plus signs indicate zones of final circumferential compression.

As will be explained later with respect to FIG. 10, this compressive reduction commences prior to the crimping operation, at which time the sleeve is free to move axially of the tube, and is available to accommodate the compressive reduction of the conical flange portion of the sleeve in the absence of axial elongation of the sleeve.

Figure 8:
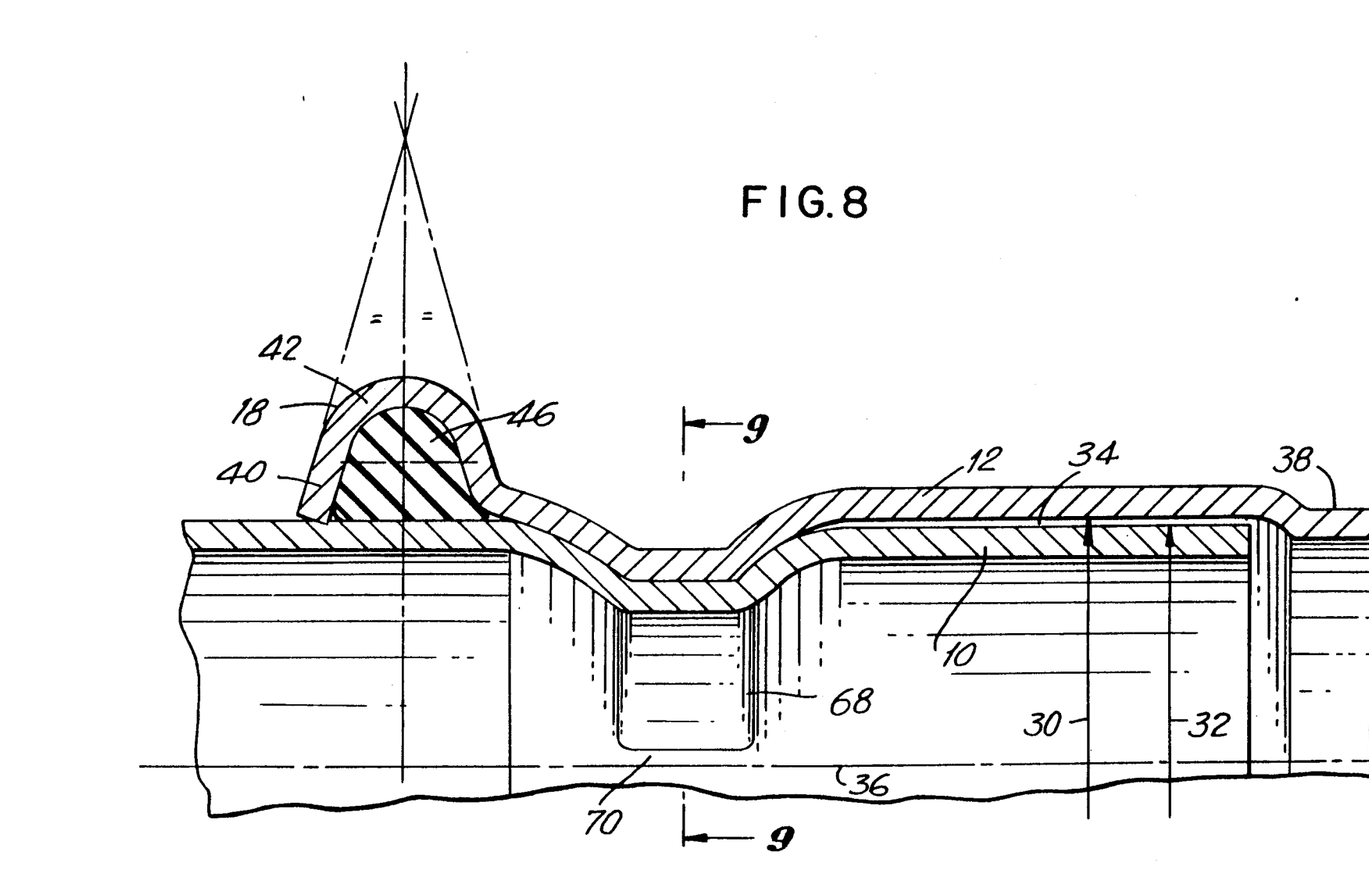
FIG. 8 is a longitudinal cross-section through a sleeve to pipe joint according to the present invention.
Figure 9:
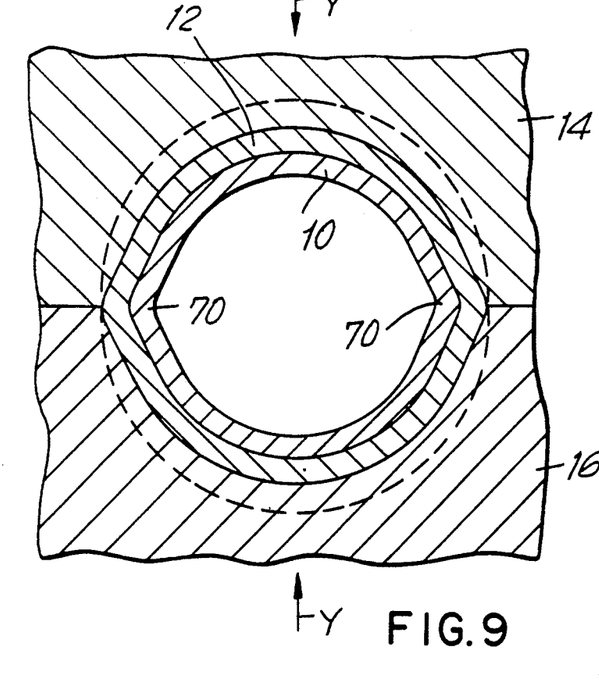
FIG. 9 is a transverse cross-section taken on the line 9—9 of FIG. 8.

FIGS. 8 and 9 illustrate a finished joint according to the present invention, respectively in longitudinal cross-section, and, in transverse cross-section in a plane which includes the sleeve to tube crimp. As will be seen, the dies 14 and 16 in moving towards each other along the Y axis, are operative firstly to effect compressive reduction of the annular flange 18 to place the seal ring 20 under radial and circumferential compression, displacement of the material of the seal ring being dominantly in an axial direction relative to the tube, and into the free zone existing in the sleeve in the interior of the annular flange 18.

Figure 10:
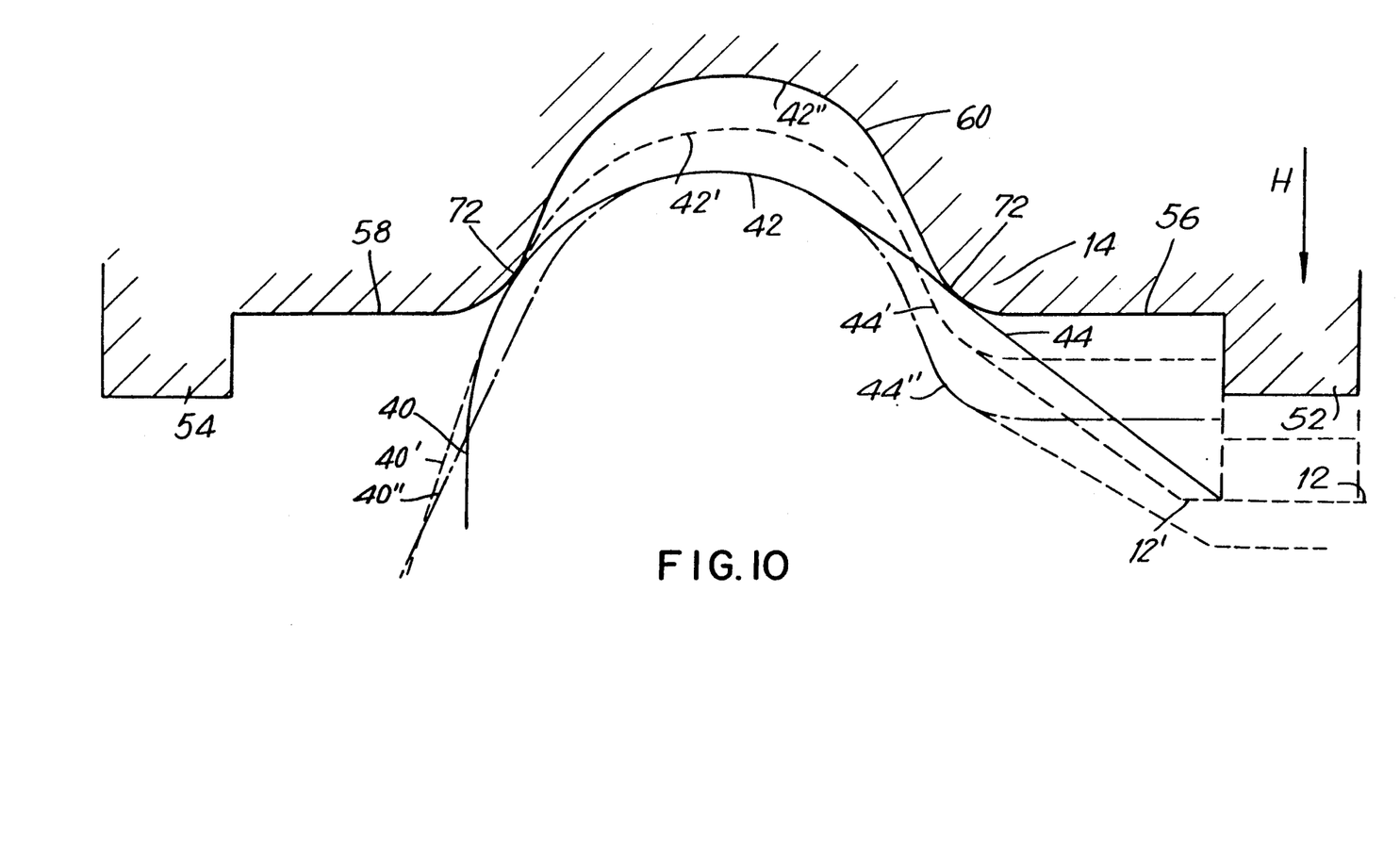
FIG. 10 is a longitudinal or axial cross-section through a crimping die as used in the present invention, and illustrates the successive steps of formation of the sleeve during a crimping operation.
Figure 11:
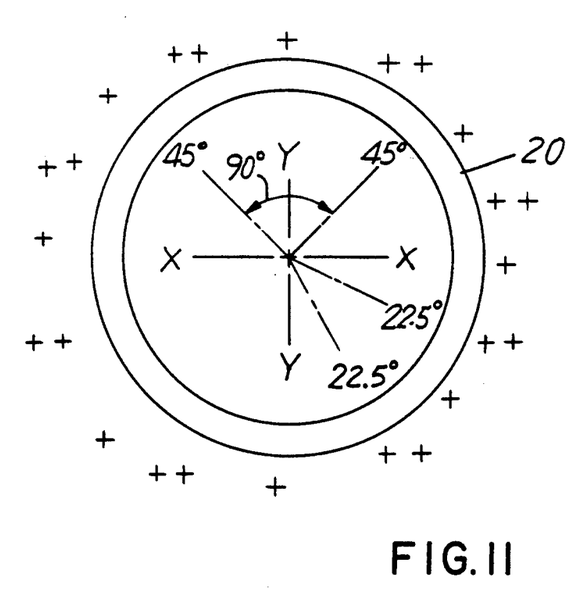
FIG. 11 is illustrative of the stress distribution in the seal ring resulting from the teachings of this invention; and, FIG. 12 is a longitudinal cross-section through a crimp as formed according to the present invention.

In moving towards the sleeve 12, the dies 14 and 16 commence compressive deformation of the annular flange 18, and then, as more particularly described with respect to FIG. 10, they then commence compressive deformation of the inclined flange portion 44, this being prior to the commencement of crimping of the sleeve 12 to the tube 10. Thus, the sleeve 12 is at that time free to move to a limited extent in directions axially of the tube 10, thus relieving the inclined flanged portion 44 from stresses acting axially of the sleeve, and which would act to resist deformation of the inclined flange portion 44.

Subsequent to the commencement of crimping of the inclined flange portion 44, then, the opposite pair of the sleeve crimping sections 54 engage the exterior of the sleeve 12, and progressively form diametrically opposed, circumferentially arcuate crimps 68, 68 in sleeve 12 and tube 10. The crimps 68 do not merge into each other at their respective opposite ends, but instead, by virtue of the configuration of the crimping sections 54 leave intact an axially straight uncrimped struts 70 connecting the sleeve and tube on one axial side of the crimps with the sleeve and tube on the opposite axial side of the crimps. The struts 70 inhibit elongation of the sleeve and tube in the vicinity of the crimps 68, and serve to maintain the structural integrity of the crimps 68 under pressure loading internally of the tube 10, and, in the presence of torsional forces acting between the sleeve 12 and the tube 10.

Referring now to FIG. 10, a cross-section through the die 14 is shown in enlarged detail, the cross-section being taken in the Y-Z plane as related to FIG. 7. In FIG. 10, for clarity of illustration, the radial flange 40, the arcuate portion 42 and the inclined portion 44 of the annular flange 18 have been illustrated diagrammatically as a single line. Also, for clarity of illustration, the seal ring 20 and the tube 10 have been omitted.

On movement of the die 14 in the direction of the arrow H, the initial engagement of the die with the sleeve 12 is by the axially opposite shoulders 72 of the die which provide a transition between the central flange forming section and the intermediate flange forming sections 56 and 58. The engagement of the shoulders 72 with the annular flange 18 will cause the radial flange 40 to displace axially towards the position 40', and also will cause deformation of the inclined portion 44 in a radial direction towards the location 44'.

Radially inward deformation of the inclined flange portion 44, will in turn cause the sleeve 12 to move axially towards the radial flange 40, such axial movement of the sleeve 12 being possible until such time as the crimping section 52 engages the sleeve 12 with sufficient force to inhibit further such axial movement of the sleeve 12 to the position 12'.

By allowing axial movement of the sleeve 12, the inclined flange portion 44 is relieved from tensile stresses acting in the direction of the tube axis, and thus, is more readily deformed in the absence of tensile stresses produced in the inclined flange portion 44, such as would arise in the event that the sleeve 12 was incapable of axial movement to the position 12'. The result is that the tensile forces induced in the inclined flange portion 44 are substantially reduced, thus substantially reducing the tendency of the inclined flange portion 44 to spring back towards its original position in an attempt to relieve tensile stresses stored in the inclined flange portion 44, and in turn acting to maintain compressive stresses existing in the inclined flange portion 44.

At the same time as axial movement of the radial flange 40 and the radially inward deformation of the inclined flange portion 44 commences, the arcuate portion 42 of the annular flange 18 bows upwardly towards the position 42', in this manner reducing the radius of the arcuate portion 42, and acting to place the contained seal ring under compressive stresses to further retain the seal ring against displacement within the annular flange 18.

This upward bowing movement in combination with the radially inward deformation of the flange portion 44, will cause the arcuate portion 42 to rotate about its point of radial generation in a clockwise direction, and will in turn move the radial flange 40 into a position 40" in which it extends forwardly of the sleeve 12 at an equal but opposite angle to the finally formed flange portion 44, as indicated in FIG. 8.

Downward movement of the die 14 continues, until such time as the radial flange 40 has reached the position 40" and the inclined flange portion 44 has reached the position 44"', the arcuate portion 42 at that time having reached the inner surface of the central flange forming section 60, subsequent to which compressive reduction of the annular flange 18 commences as the die 14 continues its downward movement.

During the latter part of the downward movement of the die 14, the sleeve crimping section 52 contacts the sleeve 12, the crimping of the sleeve 12 to the tube 10 then commencing and continuing as the die 14 moves to its final position. At this point, the radial flange 40 will have become firmly embedded in the exterior of the tube surface by virtue of the compressive reduction of the annular flange 18, tensile stresses have been relieved in the inclined flange portion 44, and, commencement of the crimp in the sleeve 12 will have occurred subsequent to the relief of tensile stresses in the inclined flange portion 44. Thus, upon removal of the die 14, the compressively reduced annular flange is located axially of the pipe 10 at the inner periphery of the radial flange 40, and, at the position of the crimp, this reducing any tendency of the sleeve 12 to move reversely along the tube as a consequence of spring forces stored in the inclined flange portion 44 and consequential reduction in the compressive stress applied to the contained seal ring.

By arranging for the flange portions 40 and 44 to move to substantially equal and opposite angles, equalization of the compressive stresses produced in the seal ring 20 is further enhanced, and, enhanced seating of the seal ring on the pipe 10 is produced.

From the previous discussion of the dies employed for performing the crimping operation, it will be apparent that what might be referred to as banana shaped crimps are formed in the sleeve and the pipe at positions spaced circumferentially of the pipe, the respective banana shaped crimps being isolated one from the other by the axially straight portions 70 providing the struts. The advantages resulting from this construction will now be described with reference to FIG. 12.

Figure 12:
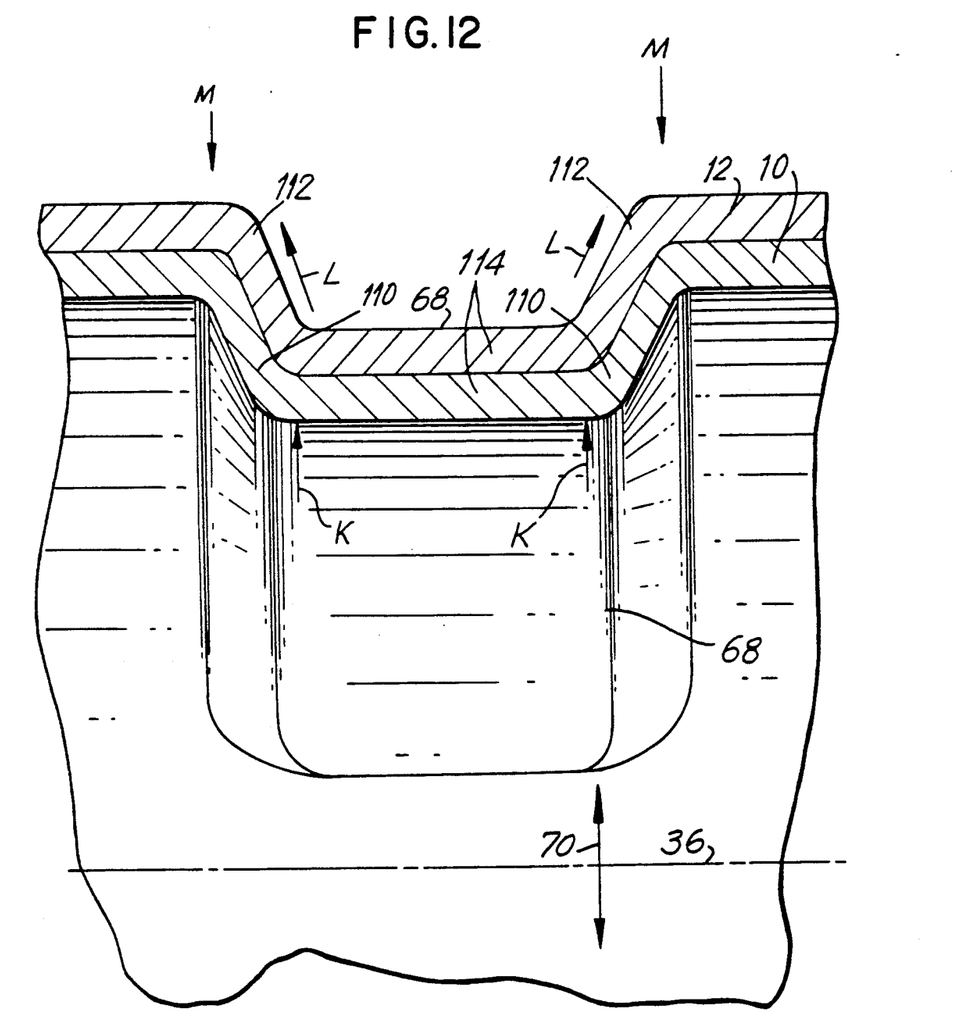

Referring now to FIG. 12, it will be seen that the crimps 68 each are of U-shaped cross-section in the direction of the axis of the pipe 10. The fact that the crimp protrudes radially inwardly of the tube 10 is of minor consequence, in that high velocity flows of fluids contained within the tube 10 is not contemplated.

The U-shaped crimps are produced by the sleeve crimping sections 52 and 54 of the dies 14 and 16.

The crimp thus produced comprises oppositely inclined walls 110 formed in the tube 10, and oppositely inclined walls 112 formed in the sleeve 12, the respectively oppositely inclined walls 110 and 112 being interconnected with each other through an axially short transitional cylindrical portion 114.

Radially inward movement of the material of the sleeve 12 during the crimping operation, will be effective to shrink the diameter of the sleeve 12, thus ensuring intimate face to face contact between the outer surface of the tube 10 and the inner surface of the tube 12 to immobilize the sleeve 12 relative to the tube 10.

If now fluid under pressure is introduced into the tube 10, then, that fluid under pressure will act both in axial and radial directions, and, in the event that the internal pressure is sufficient, will attempt to return the crimp to the original in-round condition of the tube 10 and the sleeve 12.

Radially acting forces will result in compressive stresses being developed in the oppositely inclined wall portions 110, 112 of the crimp. Those wall portions are highly resistive to the return of the crimp to its original in-round conditions, unless elongation of the crimp in an axial direction also occurs. Such elongation is prevented by the struts 70.

For example, radially outward forces K acting on the interior of the crimp will result in compressive forces L in the side walls of the crimp, which act as buttresses, the compressive forces L being dissipated in the immediately axially adjacent portions of the tube and sleeve as stresses acting to expand the unformed portions of the tube 10 and sleeve 12. The adjacent sections of the tube 10 and sleeve are, however, incapable of expansion to any material extent in that they are already in an in-round condition, the adjacent portions of the tube 10 and sleeve 12 thus being available to provide the necessary reaction forces M counterbalancing the radially outwardly acting forces L, i.e., a system of balancing forces is produced that will inhibit the expansion of the crimp in radially outward directions back to the in-round initial condition of the tube 10 and sleeve 12.

Such an expansion readily would occur in the presence of axial and radial forces produced within the pipe 10 in the event that the crimps 68 were to extend continuously around the tube 10 and sleeve 12. In such an event, then, the crimps would act as a bellows permitting axial movement of the adjacent portions of the tube 10 and sleeve 12 in opposite axial directions, at which time the radially outward forces acting on the crimp would be operative to return the crimp to its initial in-round condition.

Any such movements of the crimp are inhibited by the struts 70, which at that time are placed in tension, and, which are operative to inhibit any such axial movement of the sections of the tube 10 and pipe 12 on opposite sides of the crimps 68.

Additionally, as the crimp is held against radially outward expansion by the struts 70 and is incapable of returning back to its in-round condition, the cross-section of the tube 10 and pipe 12 in the location of the crimps 68 is non-circular, thus inhibiting relative rotation between the tube 10 and the sleeve 12 on the application of torsional forces to those members.

As will be apparent from the preceding discussion, the specific form of crimp according to the present invention is a major factor enabling sleeve to tube joints to be produced that can withstand considerably higher internal pressure than known crimped sleeve to tube joints, the crimp of the present invention, together with the manner of compressively reducing the annular flange containing the seal ring and the equalization of circumferential stresses in the seal ring each acting synergism to provide a crimped seal to tube joint that can withstand internal pressures greatly in excess of internal pressures considered maximum in the prior art, and which also enables satisfactory crimped sleeve to tube joints to be produced in pipes of far greater diameter than those previously contemplated, thus very considerably enhancing he utility of such sleeve to tube joints.

While a sleeve to tube joint has been described employing two diametrically opposite crimps with two diametrically struts, the invention is not restricted to the use of two diametrically opposite crimps. Any number of individual crimps and a corresponding number of struts can be employed, for example, four such crimps arranged in diametrically opposite pairs and four such struts arranged diametrically opposite pairs. Such a construction would have increased resistance to angulation of the axis of the pipe and sleeve at the crimp, while retaining all of the advantages of the present invention.

While the crimps have been described as being of U-shaped formation, the invention is not limited to such a U-formation. The crimps may be of other shapes producing a concave crimp surface on the outer side of the sleeve and a convex crimp surface on the inner face of the pipe which are capable of producing compressive forces within the walls of the crimp on the pressurization of the pipe interior, such as a V-shaped crimp formation.

We claim:

1. A method of joining a sleeve to a tube, comprising:
    positioning a sleeve having a seal ring containing flange portion at a free end thereof with said flange and sleeve in encircling relation with a tube, said flange providing a radially extending inclined portion at said free end
    compressively reducing said seal ring containing flange portion to bring a radially inner edge of said radially extending inclined portion of said flange into compressive engagement with the external circumferential surface of said tube;
    compressively reducing said radially extending inclined portion of said flange at said end of said sleeve in the presence of permitted relative axial movement of said sleeve relative to said tube; and,
    subsequently crimping said sleeve and tube to inhibit axial movement of said sleeve relative to said tube prior to the removal of compressive reduction forces on said inclined flanged portion.

2. The method of joining a sleeve to a tube according to the method of claim 1, further comprising:
    said step of compressively reducing said seal ring containing portion which includes the steps of compressively reducing said seal ring containing flange portion along a transverse diametrically extending X—X axis of said flange to produce elongation of said flange portion along a transverse diametrically extending Y—Y axis perpendicular to said X—X axis; and,
    then compressively reducing said flange along said Y—Y axis to produce elongation of said flange portion about axes intermediate said X—X axis and said Y—Y axis;
    whereby, said flange portion is compressively reduced in the substantial absence of displacement of a seal ring contained in said flange in directions circumferentially of said flange to minimized inequalities in compression of said seal ring.

3. The method of joining a sleeve to a tube according to the method of claim 1, further comprising:
    simultaneously crimping said sleeve and tube at diametrically opposite positions to produce crimps extending concavely of the outer surface of said sleeve and convexly of the inner surface of said tube, and respective crimps being isolated from each other circumferentially of said sleeve and tube by portions extending parallel to the axis of said sleeve and tube.

4. The method of joining a sleeve to a tube according to the method of claim 1, further comprising:
    said flange portion including respective first and second annular portions of said flange means diverging radially inwardly from a radially outer convex portion of said flange means on opposite sides of a plane transverse to the longitudinal axis of said respective sleeve and tube;
    said first annular portion extending at an angle in the range of 34°–53° to the longitudinal axis of said sleeve, and said second annular portion, after said compressive reduction, of said flange, extending perpendicular to said longitudinal axis of said sleeve.

* * * * *